Nov. 7, 1933.  C. B. SCHAFER  1,933,640
GLASS EDGING MACHINE
Filed Jan. 30, 1932    2 Sheets-Sheet 2
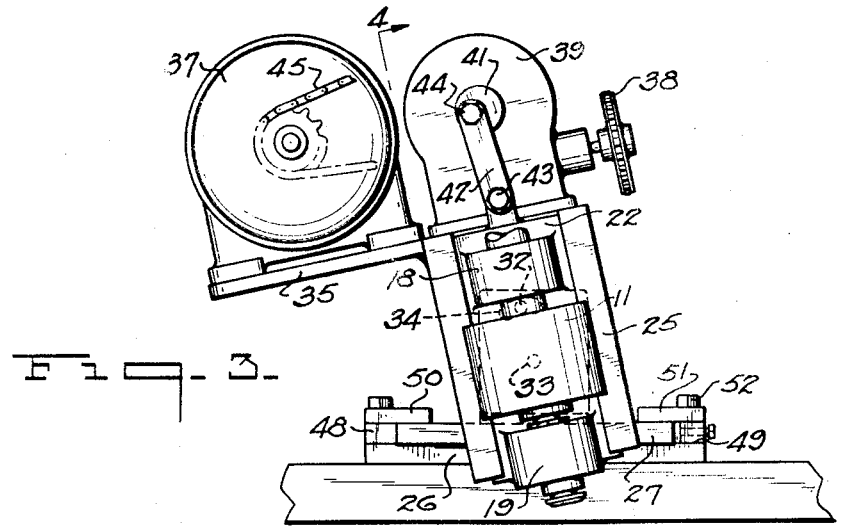
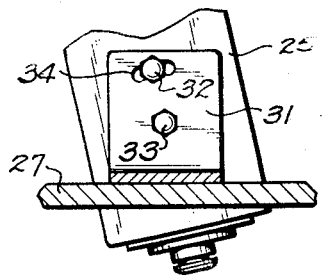
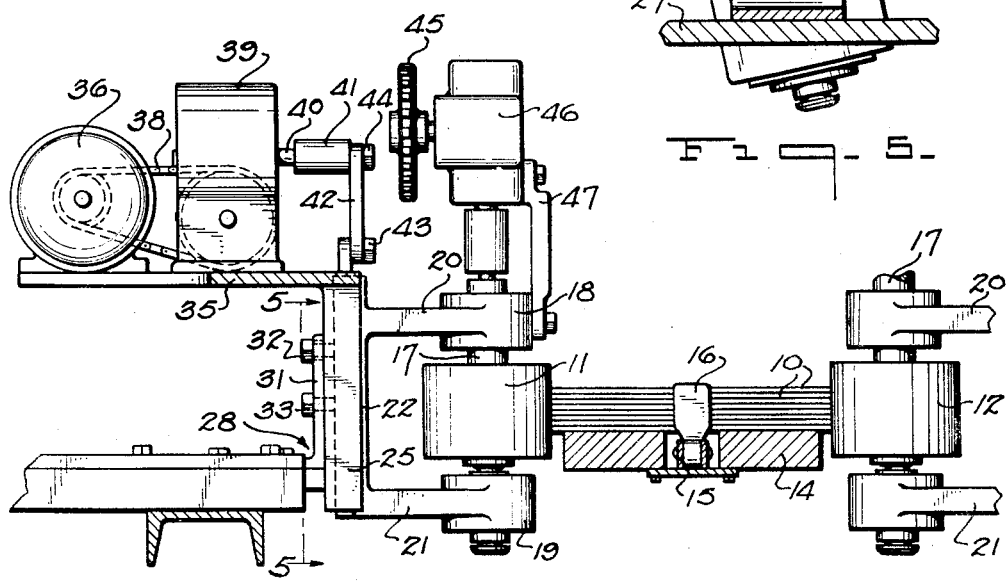
Inventor
CONRAD B. SCHAFER.
By Frank Fraser
Attorney Patented Nov. 7, 1933

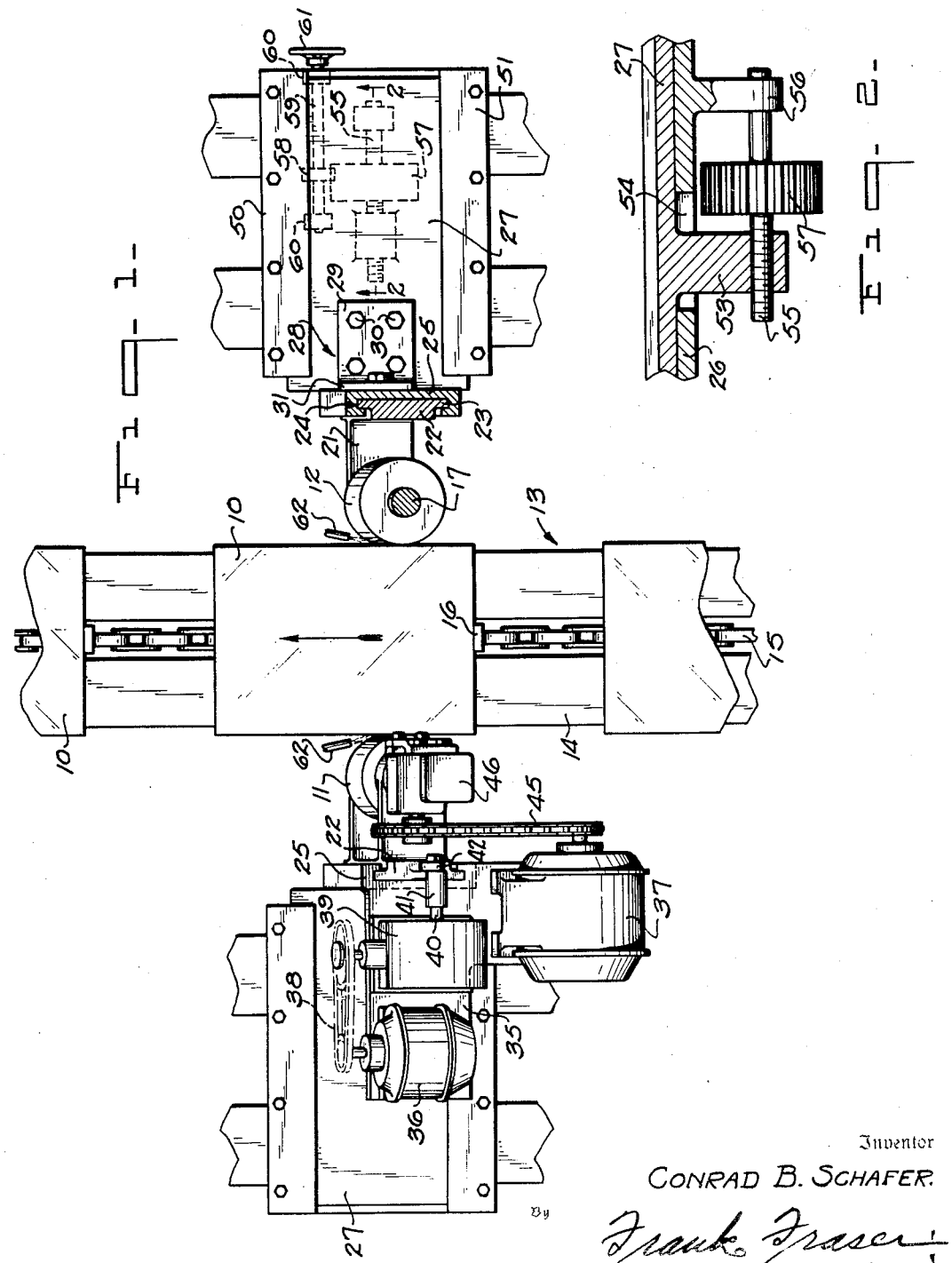

1,933,640

UNITED STATES PATENT OFFICE 1,933,640

GLASS EDGING MACHINE

Conrad B. Schafer, Toledo, Ohio, assignor to Libbey-Owens-Ford Glass Company, Toledo, Ohio, a corporation of Ohio Application January 30, 1932. Serial No. 589,833

10 Claims. (Cl. 51—40)

The present invention relates to an improved apparatus or machine for grinding the edges of glass sheets or plates or the like.

An important object of the invention resides in the provision of an apparatus or machine of the above character adapted for grinding opposite edges of one or more sheets of glass simultaneously in a rapid, convenient and efficient manner.

Another object of the invention resides in the provision of a grinding apparatus or machine of the above character including two oppositely disposed, preferably rotatable and reciprocable grinding elements, between which one or more sheets of glass may be passed in a substantially continuous manner whereby the said sheet or sheets may be ground to a predetermined and accurate size.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view, partially in section, of grinding apparatus constructed in accordance with the present invention, Fig. 2 is a detail section taken substantially on line 2—2 of Fig. 1, Fig. 3 is an elevation of one of the grinding elements showing the mounting therefor, Fig. 4 is a section taken substantially on line 4—4 of Fig. 3, and Fig. 5 is a section taken substantially on line 5—5 of Fig. 4.

Referring to the drawings, one or a plurality of sheets of glass 10, which are adapted to be ground, are adapted to be passed forwardly in a definite, substantially horizontal path between two oppositely disposed grinding elements 11 and 12 which operate upon opposite edges of the glass sheet or sheets simultaneously in a manner to finish the said edges and grind the sheet or sheets to a predetermined and accurate width. Although only one pair of grinding elements has been illustrated in the drawings, it will be apparent that two or more pairs can be employed as desired and the sheets brought successively into engagement therewith as they are carried forwardly.

The supporting and conveying means 13 for the glass sheets comprises a rather long horizontal stationary table 14 upon which the said sheets are placed in a horizontal position, the sheets being preferably stacked one upon the other as best illustrated in Fig. 4. The glass sheets are slid forwardly over the table 14 by means of a chain conveyor or the like 15 carrying pusher members 16 which engage the rear edges of the sheets to move them forwardly. The width of the glass sheets is slightly greater than that of the table 14 whereby the opposite side edges of the said sheets project therebeyond so as to be engaged by the grinding elements.

The two grinding elements 11 and 12 are of the same construction and are mounted in the same manner so that a detailed description of only one of them will be given. Thus, each grinding element is here shown as being in the form of a metallic roller or wheel mounted upon a shaft 17 which is journaled in the spaced bearing portions 18 and 19 carried by the forwardly projecting parallel arms 21 and 21 respectively, said arms being attached to or formed integral with a vertically positioned follower plate 22 provided with reduced edge or marginal portions 23 slidably mounted in ways 24 in a stationary guide member 25.

Positioned at each side of the conveyor means 13 in relatively close proximity thereto is a horizontal stationary base member 26 upon which is slidably supported a slide plate 27 movable toward and away from said conveying means in a direction at substantially right angles to the direction of travel of the glass sheets 10. Carried at the inner end of the slide plate 27 is a substantially L-shaped bracket 28, the horizontal portion 29 of which is secured to the said slide plate by suitable fastening means 30, while the upstanding vertical portion 31 of said L-shaped bracket has secured thereto the respective stationary guide member 25 with which the corresponding follower plate 22 is slidably associated.

The guide member 25 is preferably adjustably secured to the L-shaped bracket 28 by means of the two fastening elements 32 and 33. The fastening element 32 is received within a slot 34 formed in the vertical portion 31 of the L-shaped bracket 28 (Fig. 5) so that, upon loosening of fastening elements 32 and 33, the guide member 25 and parts carried thereby may be swung about the axis of fastening element 33. Hence, the shaft 17 can be vertically arranged so that the respective grinding element will rotate about an axis perpendicular to the faces of the glass sheets 10, or if desired the said shaft can be inclined to the vertical as shown in Fig. 3, whereupon the axis of rotation of the grinding element will be disposed at an angle other than a right angle with respect to the path of travel of the sheet edges.

The stationary guide member 25 carries or has formed integral therewith at its upper end a platform 35 upon which are mounted the two electric motors 36 and 37. The motor 36 is adapted to drive through a suitable chain and sprocket drive 38 and also through suitable reduction gearing contained in the casing 39, likewise mounted upon platform 35, a horizontal shaft 40 upon which is fixed a collar 41. The numeral 42 designates a link pivotally connected at one end to the upper end of the follower plate 22 as at 43 and at its opposite end to the collar 40 as at 44. The pivot point 44 is positioned eccentric with respect to the axis of rotation of shaft 40 so that upon operation of the motor 36 to drive shaft 40, a vertical reciprocating movement will be imparted to the follower plate 22 and likewise to the grinding element carried thereby.

The grinding element is also adapted to be simultaneously rotated during reciprocating movement thereof, and this rotation is effected by the motor 37 driving through a suitable chain and sprocket drive 45 and also through suitable reduction gearing contained in casing 46, the shaft 17. The reduction gearing is associated with the upper end of shaft 17 and the casing 46 containing the same is held in position by a bracket arm 47 secured to the bearing portion 18.

Secured upon the upper surface of the base member 26 along opposite longitudinal edges thereof are the strips 48 and 49 which are arranged outwardly of slide plate 27. Resting upon the strips 48 and 49 are the relatively wider strips 50 and 51 respectively which overlap the upper surface of slide plate 27 so that there is created by means of the base member 26 and strips 48, 49 and 50, 51, a guideway within which the slide plate moves. The strips 48, 49 and 50, 51 may be secured to the base member by suitable fastening elements 52.

The present invention also contemplates the provision of means for effecting proper adjustment of the grinding elements 11 and 12 toward and away from one another as desired, it being readily understood that the distance between the operative faces of the grinding elements determines the width of the glass sheets subsequent to grinding. To this end, each slide plate 27 is provided upon the bottom thereof with a depending lug 53 operating within a slot 54 in the base member 26. Threaded through the lug 53 is an adjusting bolt 55, the opposite end of which is freely mounted within a bracket 56 depending from base member 26. Carried by the bolt 55 is a gear 57 in mesh with a relatively smaller gear 58 keyed to the operating shaft 59 rotatable in bearings 60 also carried by base member 26. The operating shaft 59 carries at its outer end a hand wheel 61 and, upon rotation of this hand wheel, it will be seen that the gear 58 will effect rotation of gear 57 which will, in turn, cause the bolt 55 to be threaded through the depending lug 53. Since the bolt is fixed against longitudinal movement, the slide plate 27 and parts carried thereby will be caused to slide forwardly or backwardly, depending upon in which direction the hand wheel is turned so as to move the grinding element toward or away from the glass sheets.

In the operation of the machine above described, the two grinding rollers 11 and 12 are first adjusted relative to one another so that the distance therebetween is equal to the width of sheet desired, this adjustment being effected by the movement of the slide plates 27 upon rotation of hand wheels 61. A desired number of glass sheets 10 are then placed upon the supporting table 14, being stacked one upon the other in a horizontal position. The conveyor 15 is then placed in operation and the pusher members 16 engaging the rear edges of the glass sheets will function to slide them forwardly in the direction indicated by the arrow in Fig. 1, between and in engagement with the grinding rollers 11 and 12, which will operate to grind the opposite edges thereof simultaneously in the manner desired and reduce the sheets to a predetermined and accurate width.

During the grinding operation, each of the grinding rollers is adapted to be rotated about the axis of the corresponding shaft 17 by means of the respective motor 37, and simultaneously the said grinding roller is caused to be reciprocated transversely across the edges of the glass sheets upon operation of motor 36. That is to say, the grinding rollers will be reciprocated transversely of the sheet edges and will be simultaneously rotated about axes parallel to the path of reciprocation, or, in other words, will be rotated in a plane at substantially right angles to the path of reciprocation. This combined rotary and reciprocating movement of the grinding rollers will effect a rapid and efficient grinding of the sheet edges and will also prevent uneven wearing away or grooving of the grinding elements. In order to facilitate the grinding action of the rollers 11 and 12, a suitable abrasive material may be fed to the edges of the glass sheets at the point of grinding from the abrasive feed pipes 62. The grinding rollers may be driven either in the direction of travel of the glass sheets or in a direction opposite to the movement thereof.

As pointed out above, the shafts 17 can be disposed in a vertical position so that the grinding rollers 11 and 12 will be rotated about axes perpendicular to the faces of the glass sheets 10, or the said shafts can be inclined or tilted so that the grinding rollers will rotate about axes disposed at an angle other than a right angle with respect to the path of travel of the sheet edges.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass grinding apparatus, means for supporting and conveying a sheet of glass in a definite predetermined path, rotatable grinding elements positioned to operate upon opposite edges of the sheets during the travel thereof, means for reciprocating said elements transversely of the sheet edges, means for simultaneously rotating each grinding element about an axis parallel to its path of reciprocation, and means for adjustably mounting each grinding element so as to vary the angle of the axis of rotation thereof with respect to the sheet edges.

2. In glass grinding apparatus, means for supporting and conveying a sheet of glass in a definite predetermined path, rotatable grinding elements positioned to operate upon opposite edges of the sheet during the travel thereof, means for reciprocating said grinding elements transversely of the sheet edges, means for simultaneously rotating each grinding element in a plane at substantially right angles to its path of reciprocation, and means for adjustably mounting each grinding element so as to vary the angle of the path of reciprocation thereof relative to the sheet edges.

3. In glass grinding apparatus, means for supporting and conveying a sheet of glass in a definite predetermined path, rotatable grinding elements positioned to operate upon opposite edges of the sheet during the travel thereof, a shaft for each grinding element and upon which said element is mounted, means for reciprocating said shaft in the direction of its length to move the respective grinding element transversely with respect to the sheet edges, means for simultaneously rotating said shaft and the grinding element carried thereby, and means for adjustably mounting said shaft so that it may be disposed either in a position perpendicular to the faces of the glass sheet or at an angle other than a right angle with respect thereto.

4. In glass grinding apparatus, means for supporting and conveying a sheet of glass in a definite predetermined path, rotatable grinding elements positioned to operate upon opposite edges of the sheet during the travel thereof, a shaft for each grinding element and upon which said element is mounted, means for rotatably supporting said shaft including a movable follower plate, a stationary guide member with which said plate is slidably associated, means for reciprocating said plate and shaft to move the respective grinding element transversely of the sheet edges, and means for simultaneously rotating said shaft and the grinding element carried thereby.

5. In glass grinding apparatus, means for supporting and conveying a sheet of glass in a definite predetermined path, rotatable grinding elements positioned to operate upon opposite edges of the sheet during the travel thereof, a shaft for each grinding element and upon which said element is mounted, means for rotatably supporting said shaft including a movable follower plate, a stationary guide member with which said plate is slidably associated, means for reciprocating said plate and shaft to move the respective grinding element transversely of the sheet edges, means for simultaneously rotating said shaft and the grinding element carried thereby, and means for adjustably mounting said shaft so that it may be disposed either in a position perpendicular to the faces of the glass sheet or at an angle other than a right angle with respect thereto.

6. In glass grinding apparatus, means for supporting a sheet of glass in a horizontal position and for carrying the same in a predetermined horizontal path, a pair of rotatable grinding elements operating upon opposite edges of the sheet during the travel thereof, a substantially vertical shaft for each grinding element and upon which said element is mounted, means for supporting each shaft including a vertically disposed follower plate, a stationary guide member with which said plate is slidably associated, means connected with said follower plate for reciprocating the same so that the respective grinding element will be moved transversely of the sheet edges, and means for simultaneously rotating said shaft and the grinding element carried thereby.

7. In glass grinding apparatus, means for supporting a sheet of glass in a horizontal position and for carrying the same in a predetermined horizontal path, a pair of rotatable grinding elements operating upon opposite edges of the sheet during the travel thereof, a substantially vertical shaft for each grinding element and upon which said element is mounted, means for supporting each shaft including a vertically disposed follower plate, a stationary guide member with which said plate is slidably associated, means connected with said follower plate for reciprocating the same so that the respective grinding element will be moved transversely of the sheet edges, means for simultaneously rotating said shaft and the grinding element carried thereby, and means for pivotally mounting said guide member whereby the respective shaft may be caused to assume a position perpendicular with respect to the surfaces of the glass sheet or at an angle other than a right angle with respect thereto.

8. In glass grinding apparatus, means for supporting and conveying a sheet of glass in a definite predetermined path, a rotatable grinding element positioned to operate upon an edge of the sheet during the travel thereof, means for reciprocating said element transversely of the sheet edge, means for simultaneously rotating the grinding element about an axis parallel to its path of reciprocation, and means for adjustably mounting said grinding element so as to vary the angle of the axis of rotation thereof with respect to the sheet edge.

9. In glass grinding apparatus, means for supporting and conveying a sheet of glass in a definite predetermined path, a rotatable grinding element positioned to operate upon an edge of the sheet during the travel thereof, means for reciprocating said grinding element transversely of the sheet edge, means for simultaneously rotating the grinding element in a plane at substantially right angles to its path of reciprocation, and means for adjustably mounting said grinding element so as to vary the angle of the path of reciprocation thereof relative to the sheet edge.

10. In glass grinding apparatus, means for supporting and conveying a sheet of glass in a definite predetermined path, a rotatable grinding element positioned to operate upon an edge of the sheet during the travel thereof, a shaft for the grinding element and upon which said element is mounted, means for reciprocating said shaft in the direction of its length to move the grinding element transversely with respect to the sheet edge, means for simultaneously rotating said shaft and the grinding element carried thereby, and means for adjustably mounting said shaft so that it may be disposed either in a position perpendicular to the faces of the glass sheet or at an angle other than a right angle with respect thereto.

CONRAD B. SCHAFER.